US005970240A

United States Patent [19]
Chen et al.

[11] Patent Number: 5,970,240
[45] Date of Patent: *Oct. 19, 1999

[54] METHOD AND APPARATUS FOR CONFIGURABLE MEMORY EMULATION

[75] Inventors: Tao Shinn Chen, Cupertino; Dam Van Bui, Milpitas, both of Calif.

[73] Assignee: Quickturn Design Systems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/883,025

[22] Filed: Jun. 25, 1997

[51] Int. Cl.[6] .................................................... G06F 9/44
[52] U.S. Cl. .............................. 395/500.46; 395/500.48; 395/500.17; 711/169; 711/170; 711/211
[58] Field of Search ..................................... 395/500, 651, 395/821, 822, 823, 500.45, 500.46, 500.48, 500.17; 364/489, 490; 711/170, 173, 169, 211, 217

[56] References Cited

U.S. PATENT DOCUMENTS

| | | | |
|---|---|---|---|
| 3,106,698 | 10/1963 | Unger | 340/172 |
| 3,287,702 | 11/1966 | Borck, Jr. et al. | 340/172 |
| 3,287,703 | 11/1966 | Slotnick | 340/172 |

(List continued on next page.)

FOREIGN PATENT DOCUMENTS

| | | | |
|---|---|---|---|
| 0217291 | 9/1986 | European Pat. Off. | G06F 12/60 |
| 0 372 833 A2 | 6/1990 | European Pat. Off. | G06F 15/60 |
| 0453171A2 | 10/1991 | European Pat. Off. | |
| 0777 180 A2 | 6/1997 | European Pat. Off. | G06F 11/26 |
| 58-147236 | 9/1983 | Japan | H03K 19/177 |
| 58-147237 | 9/1983 | Japan | H03K 19/177 |
| 58-205870 | 11/1983 | Japan . | |
| 59-161839 | 9/1984 | Japan . | |
| 01154251 | 6/1989 | Japan . | |
| 1444084 | 7/1976 | United Kingdom . | |
| 218220 | 9/1986 | United Kingdom . | |
| 2180382 | 3/1987 | United Kingdom | H03K 19/00 |
| WO 96/13902 | 5/1996 | WIPO | H03K 19/173 |
| WO 96/28788 | 9/1996 | WIPO | G06F 17/50 |

OTHER PUBLICATIONS

"The Homogenous Computational Medium; New Technology For Computation", Concurrent Logic Inc., Jan. 26, 1987.
Spandorfer, "Synthesis of Logic Functions on an Array of Integrated Circuits", Contract Report AFCRI-6-6-298, Oct. 31, 1965.
J. Babb, R. Tessier, A.Agarwal, Virtual Wires; Overcoming Pin Limitation, IEEE, 1993, pp. 142-151.
R.Goering; "Emulation for the Masses" Electronic Engineering Times; Jan. 96.
M.McFarland, A.Parker, R.Camposano "The High-Level Synthesis of Digital Systems", IEEE, 1990, pp. 301-316.
T.Payne; Automated Partitioning of Hierarchically Specified Digital Systems; May 1981, pp. 1-132.
Tham, "Parallel Processing CAD Applications", IEEE Design & Test of Computer, Oct. 1987, pp. 13-17.
Agrawal, et al. "MARS: A Multiprocessor-Based Programmable Accelerator", IEEE Design & Test Computers, Oct. 1987, pp. 28-36.

*Primary Examiner*—Kevin J. Teska
*Assistant Examiner*—Thai Phan
*Attorney, Agent, or Firm*—Lyon & Lyon LLP

[57] ABSTRACT

A configurable method and apparatus for implementing the various large memory instances commonly found in a user's design in a hardware logic emulation system is disclosed. No external boards or systems are required to implement typical memory instances. The method and apparatus sorts the memory instances in the user's input design, packing as many memory instances as possible into a physical RAM on the emulation boards. The method also counts the number of physical RAMs necessary to implement the plurality of memory instances. The method maps the memory instances into physical RAMs, and routes the address, data and control signals and controller circuit into a programmable logic chip.

4 Claims, 5 Drawing Sheets

U.S. PATENT DOCUMENTS

| | | | |
|---|---|---|---|
| 3,473,160 | 10/1969 | Wahlstrom | 340/172 |
| 3,810,577 | 5/1974 | Drescher et al. | 340/172 |
| 3,928,730 | 12/1975 | Agaard et al. | 379/275 |
| 3,955,180 | 5/1976 | Hirtle | 340/172 |
| 4,020,469 | 4/1977 | Manning | 364/200 |
| 4,032,899 | 6/1977 | Jenny et al. | 364/200 |
| 4,306,286 | 12/1981 | Cocke et al. | 364/200 |
| 4,315,315 | 2/1982 | Kossiakoff | 364/300 |
| 4,357,678 | 11/1982 | Davis | 364/900 |
| 4,386,403 | 5/1983 | Hsieh et al. | 364/300 |
| 4,404,635 | 9/1983 | Flaker | 364/481 |
| 4,459,694 | 7/1984 | Ueno et al. | 371/21 |
| 4,488,354 | 12/1984 | Chan et al. | 29/830 |
| 4,503,386 | 3/1985 | DasGupta et al. | 324/73 |
| 4,510,602 | 4/1985 | Engdahl et al. | 371/21 |
| 4,524,240 | 6/1985 | Stock et al. | 174/685 |
| 4,525,789 | 7/1985 | Kemper et al. | 364/481 |
| 4,527,115 | 7/1985 | Mehrotra et al. | 324/73 |
| 4,527,249 | 7/1985 | Van Brunt | 364/578 |
| 4,539,564 | 9/1985 | Smithson | 340/825.79 |
| 4,541,071 | 9/1985 | Ohmori | 364/900 |
| 4,577,276 | 3/1986 | Dunlop et al. | 364/491 |
| 4,578,761 | 3/1986 | Gray | 364/481 |
| 4,583,169 | 4/1986 | Cooledge | 364/300 |
| 4,587,625 | 5/1986 | Marino, Jr. et al. | 364/578 |
| 4,593,363 | 6/1986 | Burstein et al. | 364/491 |
| 4,600,846 | 7/1986 | Burrows | 307/465 |
| 4,612,618 | 9/1986 | Pryor et al. | 364/900 |
| 4,613,940 | 9/1986 | Shenton et al. | 364/490 |
| 4,621,339 | 11/1986 | Wagner et al. | 364/900 |
| 4,642,487 | 2/1987 | Carter | 307/465 |
| 4,656,580 | 4/1987 | Hitchcock, Sr. et al. | 364/200 |
| 4,656,592 | 4/1987 | Spaanenburg et al. | 364/490 |
| 4,674,089 | 6/1987 | Poret et al. | 371/25 |
| 4,675,832 | 6/1987 | Robinson et al. | 364/521 |
| 4,695,740 | 9/1987 | Carter | 307/242 |
| 4,695,950 | 9/1987 | Brandt et al. | 364/200 |
| 4,695,968 | 9/1987 | Sullivan, II et al. | 364/578 |
| 4,695,999 | 9/1987 | Lebizay | 370/58 |
| 4,697,241 | 9/1987 | Lavi | 364/488 |
| 4,700,187 | 10/1987 | Furtek | 340/825.83 |
| 4,706,216 | 11/1987 | Carter | 364/94 |
| 4,713,557 | 12/1987 | Carter | 307/242 |
| 4,722,084 | 1/1988 | Morton | 371/9 |
| 4,725,835 | 2/1988 | Schreiner et al. | 340/825.83 |
| 4,725,971 | 2/1988 | Doshi et al. | 364/578 |
| 4,736,338 | 4/1988 | Saxe et al. | 364/578 |
| 4,740,919 | 4/1988 | Elmer | 365/104 |
| 4,744,084 | 5/1988 | Beck et al. | 371/23 |
| 4,747,102 | 5/1988 | Funatsu | 371/23 |
| 4,752,887 | 6/1988 | Kuwahara | 364/491 |
| 4,758,745 | 7/1988 | El Gamal et al. | 307/465 |
| 4,758,985 | 7/1988 | Carter | 365/94 |
| 4,761,768 | 8/1988 | Turner et al. | 365/201 |
| 4,766,569 | 8/1988 | Turner et al. | 365/185 |
| 4,768,196 | 8/1988 | Jou et al. | 371/25 |
| 4,769,817 | 9/1988 | Krohn et al. | 364/23 |
| 4,777,606 | 10/1988 | Fournier | 364/491 |
| 4,782,440 | 11/1988 | Nomizu et al. | 364/200 |
| 4,782,461 | 11/1988 | Mick et al. | 364/900 |
| 4,786,904 | 11/1988 | Graham et al. | 340/825.83 |
| 4,787,061 | 11/1988 | Nei et al. | 364/900 |
| 4,787,062 | 11/1988 | Nei et al. | 364/900 |
| 4,791,602 | 12/1988 | Resnick | 364/900 |
| 4,803,636 | 2/1989 | Nishiyama et al. | 364/491 |
| 4,811,214 | 3/1989 | Nosenchuck et al. | 364/200 |
| 4,815,003 | 3/1989 | Patatunda et al. | 364/200 |
| 4,819,150 | 4/1989 | Jennings et al. | 364/200 |
| 4,823,276 | 4/1989 | Hiwatashi | 364/491 |
| 4,827,427 | 5/1989 | Hyduke | 364/488 |
| 4,829,202 | 5/1989 | Austin | 307/465 |
| 4,835,705 | 5/1989 | Fujino et al. | 364/491 |
| 4,845,633 | 7/1989 | Furtek | 364/490 |
| 4,849,904 | 7/1989 | Aipperspach et al. | 364/489 |
| 4,849,928 | 7/1989 | Hauck | 395/500 |
| 4,854,039 | 8/1989 | Wendt | 29/832 |
| 4,855,669 | 8/1989 | Mahoney | 324/73 |
| 4,862,347 | 8/1989 | Rudy | 364/200 |
| 4,864,165 | 9/1989 | Hoberman et al. | 307/467 |
| 4,868,419 | 9/1989 | Austin | 307/440 |
| 4,870,302 | 9/1989 | Freeman | 340/465 |
| 4,873,459 | 10/1989 | El Gamal et al. | 307/465 |
| 4,876,466 | 10/1989 | Kondou et al. | 307/465 |
| 4,879,646 | 11/1989 | Iwasaki et al. | 364/200 |
| 4,882,690 | 11/1989 | Shinsha et al. | 364/490 |
| 4,899,273 | 2/1990 | Omoda et al. | 364/200 |
| 4,901,259 | 2/1990 | Watkins | 364/578 |
| 4,901,260 | 2/1990 | Lubachevsky | 364/578 |
| 4,908,772 | 3/1990 | Chi | 364/491 |
| 4,914,612 | 4/1990 | Beece et al. | 364/578 |
| 4,918,440 | 4/1990 | Furtek | 340/825.83 |
| 4,918,594 | 4/1990 | Onizuka | 364/208 |
| 4,922,432 | 5/1990 | Kobayashi et al. | 364/490 |
| 4,924,429 | 5/1990 | Kurashita et al. | 364/578 |
| 4,931,946 | 6/1990 | Ravindra et al. | 364/490 |
| 4,935,734 | 6/1990 | Austin | 340/825.83 |
| 4,937,827 | 6/1990 | Beck et al. | 371/23 |
| 4,942,536 | 7/1990 | Watanabe et al. | 364/490 |
| 4,942,615 | 7/1990 | Hirose | 364/578 |
| 4,945,503 | 7/1990 | Takasaki | 364/578 |
| 4,949,275 | 8/1990 | Nonaka | 364/490 |
| 4,951,220 | 8/1990 | Ramacher et al. | 364/488 |
| 4,958,324 | 9/1990 | Devin | 365/201 |
| 4,965,739 | 10/1990 | Ng | 364/491 |
| 4,972,334 | 11/1990 | Yamabe et al. | 364/260.9 |
| 4,972,372 | 11/1990 | Ueno | 365/201 |
| 5,003,487 | 3/1991 | Drumm et al. | 364/489 |
| 5,023,775 | 6/1991 | Poret | 364/200 |
| 5,031,129 | 7/1991 | Powell et al. | 364/717 |
| 5,036,473 | 7/1991 | Butts et al. | 340/172 |
| 5,041,986 | 8/1991 | Tanishita | 364/489 |
| 5,046,017 | 9/1991 | Yuyama et al. | 364/491 |
| 5,051,938 | 9/1991 | Hyduke | 364/578 |
| 5,053,980 | 10/1991 | Kanazawa | 364/578 |
| 5,068,812 | 11/1991 | Schaefer et al. | 364/578 |
| 5,081,602 | 1/1992 | Glover | 364/578 |
| 5,083,083 | 1/1992 | El-Ayat et al. | 324/158 |
| 5,084,824 | 1/1992 | Lam et al. | 364/490 |
| 5,093,920 | 3/1992 | Agrawal et al. | 395/800 |
| 5,109,353 | 4/1992 | Sample et al. | 364/580 |
| 5,114,353 | 5/1992 | Sample | 439/65 |
| 5,126,966 | 6/1992 | Hafeman et al. | 364/500 |
| 5,128,871 | 7/1992 | Schmitz | 364/490 |
| 5,140,526 | 8/1992 | McDermith et al. | 364/488 |
| 5,172,011 | 12/1992 | Leuthold et al. | 307/272.2 |
| 5,224,055 | 6/1993 | Grundy et al. | 364/488 |
| 5,224,056 | 6/1993 | Chene et al. | 364/490 |
| 5,231,588 | 7/1993 | Agrawal et al. | 364/489 |
| 5,231,589 | 7/1993 | Itoh et al. | 364/490 |
| 5,233,539 | 8/1993 | Agrawal et al. | 364/489 |
| 5,253,363 | 10/1993 | Hyman | 395/800 |
| 5,259,006 | 11/1993 | Price et al. | 375/107 |
| 5,276,854 | 1/1994 | Court et al. | 395/500 |
| 5,321,828 | 6/1994 | Phillips et al. | 395/500 |
| 5,329,470 | 7/1994 | Sample et al. | 364/578 |
| 5,329,471 | 7/1994 | Swoboda et al. | 364/578 |
| 5,331,571 | 7/1994 | Aronoff et al. | 364/490 |
| 5,339,262 | 8/1994 | Rostoker et al. | 364/578 |
| 5,341,483 | 8/1994 | Frank et al. | 395/400 |
| 5,345,580 | 9/1994 | Tamaru et al. | 395/500 |
| 5,352,123 | 10/1994 | Sample et al. | 439/61 |
| 5,377,123 | 12/1994 | Hyman | 364/489 |

| | | | |
|---|---|---|---|
| 5,386,550 | 1/1995 | Yumioka et al. | 395/575 |
| 5,396,498 | 3/1995 | Lestrat et al. | 371/3 |
| 5,425,036 | 6/1995 | Lui et al. | 371/23 |
| 5,437,037 | 7/1995 | Furuichi | 395/700 |
| 5,448,496 | 9/1995 | Butts et al. | 364/489 |
| 5,448,522 | 9/1995 | Huang | 365/189.04 |
| 5,452,231 | 9/1995 | Butts et al. | 364/488 |
| 5,452,239 | 9/1995 | Dai et al. | 364/578 |
| 5,475,624 | 12/1995 | West | 364/578 |
| 5,475,830 | 12/1995 | Chen | 395/500 |
| 5,477,475 | 12/1995 | Sample et al. | 364/578 |
| 5,479,355 | 12/1995 | Hyduke | 364/488 |
| 5,530,958 | 6/1996 | Agarwal et al. | 395/403 |
| 5,544,069 | 8/1996 | Mohsen | 364/489 |
| 5,546,562 | 8/1996 | Patel | 395/500 |
| 5,551,013 | 8/1996 | Beausoleil | 395/500 |
| 5,563,829 | 10/1996 | Huang | 356/189.04 |
| 5,572,710 | 11/1996 | Asano et al. | 395/500 |
| 5,574,388 | 11/1996 | Barbier et al. | 326/41 |
| 5,596,742 | 1/1997 | Agrawal et al. | 395/500 |
| 5,612,891 | 3/1997 | Butts et al. | 364/489 |
| 5,623,664 | 4/1997 | Calvert et al. | 395/651 |
| 5,649,176 | 7/1997 | Selvidge et al. | 395/551 |
| 5,659,716 | 8/1997 | Selvidge et al. | 395/500 |

OTHER PUBLICATIONS

I.Maliniak, Pin Multiplexing Yields Low–Cost Logic Emulation, Electronic Design, Jan. 1996.

R.Tessier, J.Babb,M.Dahl, S.Hanono and A.Agarwal, "The Virtual wires Emulation System; A Gate Efficient ASIC Prototyping Environment", ACM Workshop on FPGA's (FPGA '94) Feb. 94.

Manning "An Approach to Highly Integrated, Computer–Maintained Cellular Arrays", IEEE Transactions on Computers, Vol. C–26, Jun. 1977, pp. 536–552.

Manning, "Automatic Test, Configuration, and Repair of Cellular Arrays", Doctoral Thesis MAC TR–151 (MIT), Jun. 1975.

M.Dahl,J.Babb,R.Tessler,S.Hanono,D.Hoki and A.Agarwal, "Emulation of a Sparcle Microprocessor With the MIT, Virtual Wires Emulation System", IEEE Workshop on FPGAs for Custom Computing Machines '94 (FCCM '94), Apr. 1994.

A.Agarwal; Virtual Wires: A Technology for Massive Multi–FPGA Systems; Virtual Machine Works.

Ravenscroft, Function Language Extractor and Boolean Generator IEEE 1986, pp. 120–123.

Shoup, "Programmable Cellular Logic Arrays," Doctoral Thesis (Carnegie–Mellon University; DARPA contract No. F44620–67–C0058), Mar. 1970.

Shoup, "Programmable Cellular Logic," undated, pp. 27–281.

Wynn, "In–Circuit Emulation for ASIC–Based Designs" VLSI Systems Design, Oct. 1986, pp. 38–45.

Minnick, "Survey of Microcellular Research," Stanford Research Institute Project 5876 (Contract AF 19(628)–5828), Jul. 1966.

VHDL Mixed–Level Fault Simulator; IKOS Systems Mar. 26, 1997.

Siegel "The Design of a Logic Simulation Accelerator", Oct. 1985 pp. 76–86 VLSI Systems Design.

Minnick, "A Programmable Cellular Array," undated, pp. 25–26.

Minnick, "Cutpoint Cellular Logic," IEEE Transactions on Electronic Comuters, Dec. 1964, pp. 685–698.

Jump, et al. "Microprogrammed Arrays," IEEE Transactions on Computers, vol. C–21, No. 9, Sep. 1972, pp. 974–984.

J.W. Babb, "Virtual Wires: Overcomming Pin Limitations in FPGA–based Logic Emulation", Masters Thesis, Massachusette Institute of Technology, Departmment of Electrical Engineering and Computer Science, Nov. 1993; Also available as MIT/LCS Technical Report TR–586.

Gentile, et al. "Design of Switches for Self–Reconfiguring VLSO Array Structures," Microprocessing and Microprogramming, North–Holland, 1984, pp. 99–108.

Sami, et al. "Reconfigurable Architectures for VLSI Processing Arrays," AFIPS Conference Proceedings, 1983 National Computer Conference, May 16–19, 1983, pp. 565–577.

Beece et al. "The IBM Engineering Verification Engine," $25^{th}$ ACM/IEEE Design Automation Conference, Paper 17.1, 1988 pp. 218–224.

Pfister, "The Yorktown Simulation Engine: Introduction," $19^{th}$ Design Automation Conference, Paper 7.1 1982, pp. 51–54.

Denneau, "The Yorktown Simulation Engine," $19^{th}$ Design Automation Conference, Paper 7.2, 1982, pp. 55–59.

Kronstadt, et al., "Software Support For the Yorktown Simulation Engine," $19^{th}$ Design Automation Conference, Paper 7.3, 1982, pp. 60–64.

Koike, et al., "HAL: A High–Speed Logic Simulation Machine," IEEE Design & Test, Oct. 1985, pp. 61–73.

VirtuaLogic SLI Emulation System; IKOS Systems Mar. 26, 1997.

Logic Emulation For The Masses Arrives; IKOS Systems Mar. 26, 1997.

Shear,"Tools help you retain the advantages of using breadboards in gate–array design," EDN, Mar. 18, 1987, pp. 81–88.

McClure, "PLD Breadboarding of Gate Array Designs," VLSI Systems Design, Feb. 1987, pp. 36–41.

Anderson, "Restructurable VLSI Program" Report No. ESD–TR–80–192 (DARPA Contract No. F19628–80–C–0002), Mar. 31, 1980.

Xilinx, First Edition, "The Programmable Gate Array Design Handbook," 1986, pp. 1–1 to 4–33.

Odaware, "Partitioning and Placement Technique for CMOS Gate Arrays," IEEE Transactions on Computer Aided Design, May 1987, pp. 355–363.

Beresford, "An Emulator for CMOS ASICS," VLSI Systems Design, May 4, 1987, p. 8.

Mentor Graphics Corp., "Gate Station User's Manual," 1987, (excerpts).

Mentor Graphics Corp., "Technology Definition Format Reference Manual," 1987, (excerpts).

Chen, "Fault–Tolerant Wafer Scale Architectures Using Large Crossbar Switch Arrays," excerpt from Jesshope, et al., Wafer Scale Integration, A.Hilger, 1986, pp. 113–124.

Kung, "Why Systolic Architectures?," Computer, Jan. 1982, pp. 37–46.

Hedlund, "Wafer Scale Integration of Parallel Processors," Doctoral Thesis (Purdue University; Office of Naval Research Contracts N00014–80–K–0816 & N00014–81–K–0360) 1982.

Fiduccia, et al. "A Linear–Time Heuristic For Improving Network Partitions," IEEE Design Automation Conference, 1982, pp. 175–181.

Trickey, "Flamel: A High–Level Hardware Compiler," IEEE Transaction on Computer–Aided Design, Mar., 1987, pp. 259–269.

Schweikert, "A Proper Model for the Partitioning of Electrical Circuits," Bell Telephone Laboratories, Inc. Murray Hill, N.J., pp. 57–62.

"Partitioning of PLA Logic," IBM TDM, vol. 28, No. 6, Nov. 1985, pp. 2332–2333.

Goossens, et al., "A Computer–Aided Design Methodology for Mapping DSP–Algorithms onto Custom Multi–Processing Architectures," IEEE 1986, pp. 924–925.

Hedlund, et al., "Systolic Architectures–A Wafer Scale Approach," IEEE, 1984, pp. 604–610.

IKOS Systems to Acquire Virtual Machineworks; IKOS Systems Mar. 26, 1997.

Choi, et al., "Fault Diagnosis of Switches in Wafer–Scale Arrays," IEEE, 1986, pp. 292–295.

Runner, "Synthesizing Ada's Ideal machine Mate," VLSI Systems Design, Oct., 1988, pp. 30–39.

Wagner, "The Boolean Vector Machine," ACM SIGARCH, 1983, pp. 59–66.

Preparata, "The Cube–Connected Cycles: A Versatile Network for Parallel Computation," Communications of the ACM, May, 1981, pp. 300–309.

Clos, "A Study of Non–Blocking Switching Networks," The Bell System Technical Journal, Mar. 1953, pp. 126–144.

Masson, "A Sampler of Circuit Switching Networks" Computer, Jun. 1979, pp. 32–48.

"Plus Logic FPGA2020 Field Programmable Gate Array" Brochure by Plus Logic, San Jose, CA, pp. 1–13.

Schmitz, "Emulation of VLSI Devices Using LCAs," VLSI systems Design, May 20, 1987, pp. 54–62.

Abramovici, et al., "A Logic Simulation Machine," $19^{th}$ Design Automation Conference, Paper 7.4, 1982, pp. 65–73.

Hennessy, "Partitioning Programmable Logic Arrays,"undated, pp. 180–181.

DeMicheli, et al., "Topological Partitioning of Programmable Logic Arrays," undated, pp. 182–183.

Hou, et al., "A High Level Synthesis Tool For Systolic Designs," IEEE, 1988, pp. 665–673.

"Gate Station Reference Manual," Mentor Graphics Corp., 1987 (excerpts).

Dussault, et al., "A High Level Synthesis Tool for MOS Chip Design," $21^{st}$ Design Automation conference, 1984, IEEE, pp. 308–314.

DeMicheli, et al., "Hercules–a System for High Level Synthesis," $25^{th}$ ACM/IEEE Design Automation Conference, 1988, pp. 483–488.

J.Babb, A.Agrawal "More Virtual Wires", article from Webmaster@cag.lcs.mit.edu Feb. 3, 1995.

R. Tessier "More Virtual Pictures", article from Webmaster@cag.Ics.mit.edu Feb. 3, 1995.

Donnell, "Corsspoint Switch: A PLD Approach," Digital Design, July 1986 pp. 40–44.

Beresford, "Hard Facts, Soft ASICS," VLSI Systems Design, Dec. 1986, p. 8.

"ERA60100 Electrically Reconfigurable Array–ERA," Brochure by Plessey Semiconductors, Apr. 1989.

Snyder, "Introduction to the Configurable, Highly Parallel Computer," Report CSD–TR–351, Office of Naval Research Contracts N00014–80–K–0816 and N00014–8–1–K–0360, Nov. 1980.

Paleski, et al., "Logic Partitioning for Minimizing Gate Arrays," IEEE Transactions on Computer–Aided Design of Integrated Circuits and Systems, vol. CAD–2, No. 2, Apr. 1983.

Chin, et al. A Dynamically Reconfigurable Interconnect Chip: IEEE International Solid State Circuits conference, 1987; pp. 276–277 & 425.

McCarthy, "Partitioning Adapts Large State Machines to PLDs," EDN, Sep. 17, 1987, pp. 163–166.

Geoffrey Mott, et al. "The Utility of Hardware Accelerators in the Design Environmment," Oct. 1985, pp. 62–71, VLSI Systems Design.

"The Programmable Gate Array Data Book", Xilinx Inc. 1988.

Kautz, et al., "Cellular Interconnection Arrays," IEEE Transactions on Computers, vol. C–17, No. 5, May 1968, pp. 443–451.

Kautz, et al. "Cellular Logic–in–Memory Arrays," IEEE Transaction on Computers, vol. C–18, No. 8, Aug. 1969, pp. 719–727.

M.Dahl, "An Implementation of the Virtual Wires Interconnect Scheme", Masters Thesis, Massachusetts Institute of Technology, Department of Electrical Engineering and Computer Science, Feb. 1994; Also available as MIT/LCS Technical Report.

T.J. Bauer, "Thje Design of an Efficient Hardware Subroutine Protocol for FPGAs" Masters Thesis, Massachusetts Institute of Technology, Department of Electrical Engineering and Computer Science, May. 1994; Also available as MIT/LCS Technical Report.

Wirbel, "Plus Logic Rethinks PLD Approach," newspaper article, not dated, one page.

Pardner Wynn, "In–Circuit Emulation for ASIC–Based Designs," Oct. 1986, pp. 38–46, VLSI Systems Design.

Nick Schmits, "Emulation of VLSI Devices Using LACs," May 20, 1987, pp. 54–63, VLSI Systems Design.

Prathima Agrawal, "A Hardware Logic Simulation System," Jan. 1980, pp. 19–29, IEEE Transactions on Computer Aided Design, vol. 9, No. 1.

Munoz, et al., "Automatic Partitioning of Programmable Logic Devices," VLSI Systems Design, Oct. 1987, pp. 74–86.

Feng, "A Survey of Interconnection Networks," Computer, Dec. 1981, pp. 12–27.

Chapter 36, "Switching Networks and Traffic Concepts, "Reference Data for Radio Engineers, Howard W. Sams & Co., 1981, pp. 36–1 to 36–16.

S.Hanono, "Inner View Hardware Debugger; A Logic Analysis Tool for the Virtual Wires Emulation Systems", Masters Thesis, Massachusetts Institute of Technology, Department of Electrical Engineering and Computer Science, Jan. 1995; Also available as MIT/LCS Technical Report.

Alfred E. Dunlop, et al., "A Procedure for Placement of Standard–Cell VLSI Circuits," 1985 IEEE, pp. 92–98.

Ching–Wei Yeh, et al., "A General Purpose Multiple Way Partitioning Algorithm," pp. Q15400–Q15405.

Balakrishman Krishnamurthy, "An Improved Min–Cut Algorithm for Partitioning LVSI Networks," May 1984, pp. 438–446, IEEE Transactions on Computers, vol. C–33, No. 5.

Andrew B. Kahng, "Fast Hypergraph Partition," pp. 662–666, $26^{th}$ ACM/IEEE Design Automation Conference.

Mark R. Hartoog, "Analysis of Placement Procedures for VLSI Standard Cell Layout," pp. 314–319, $23^{rd}$ Design Automation Conference.

Jorn Garbers, et al., "Findings Clusters in VLSI Circuits," 1990 IEEE, pp. 520–523.

Yen–Chuen Wei, et al. "Towards Efficient Hierarchial Designs by Ratio Cut Partitioning,"1989 IEEE.

Yen–Chuen Wei, et al., "Ratio Cut Partitioning for Hierarchial Designs," pp. 1–24.

Wolfgang Rosenstiel, "Optimizations in High Level Synthesis," 1986, pp. 347–352, Microprocessing and Microprogramming.

Malik, Sharad, et al., "Combining Multi–Level Decomposition and Topological Partitioning for PLAS," IEEE 1987, pp. 112–115.

Bradsma, et al., "The Hardware Simulator: A Tool for Evaluting Computer Systems," IEEE Transactions on Computers, Jan., 1977, pp. 68–72.

Horstmann, "Macro Test Circuit Generation," IBM TDM vol. 18, No. 12, May 1976 pp. 4023–4029.

IMB TDM "Testing Multiple Discrete Software Components by Connecting Real and Simulated Hardware Components," vol. 30, No. 4, Sep. 1987, pp. 1844–1845.

William S. Carter, et al., "A User Programmable Reconfigurable Logic Array," 1986 IEEE, pp. 233–235, Custom Integrated Circuits Conference.

R. Ayres, "Silicon Compilation a Hierarchical Use of PLAs", Xerox Corporation, pp. 314–326.

Borriello; "High–Level Synthesis: Current Status and Future Directions" IEEE 1988, pp. 477–482.

McFarland; "Tutorial on High–Level Synthesis" $25^{th}$ ACM/IEEE Design Automation Conference, 1988, pp. 330–336.

J. Babb, "Virtual Wires; Overcoming Pin Limitations in FPGA–based Logic Emulators", Massachusetts Institute of Technology, Student Workshop on Scalable Computing, Aug. 4, 1993.

R. Tessier, J.Babb, M.Dahl, S.Hanono and D.Hoki, "The Virtual Wires Emulation System: A Gate–Efficient ASIC Prototyping Environment", MIT, Student Workshop on Scalable Computing Jul. 21–22 1994.

D.Jones; A Time–Multiplexed FPGA Architecture For Logic Emulation; 1995.

| |
|---|
| 2K x 32 (instA bits 0:31) |
| 2K x 32 (instA bits 32:63) |
| 2K x 32 (instA bits 64:67) |
| 4K x 8 (instB) |
| 16K x 8 (instC) |
| 6K x 32 (unused) |

| Address | High Address Bits |
|---|---|
| | 14 13 12 11 |
| 0 | 0 0 0 0 |
| 2048 | 0 0 0 1 |
| 4096 | 0 0 1 0 |
| 6144 | 0 0 1 1 |
| 10,240 | 0 1 0 1 |
| 26,624 | 1 1 0 1 |
| 32,767 | |

| | Time Slot |
|---|---|
| 0000 (offset to RA1 instA bits 0:31) | 0 |
| 0001 (offset to RA1 instA bits 31:63) | 1 |
| 0010 (offset to RA1 instA bits 64:67) | 2 |
| 0011 (offset to RA1 instB) | 3 |
| 0011 (offset to RA2 instB) | 4 |
| 0101 (offset to RA1 instC) | 5 |
| 0000 (offset to WA1 instA bits 0:31) | 6 |
| 0001 (offset to WA1 instA bits 32:63) | 7 |
| 0010 (offset to WA1 instA bits 64:67) | 8 |
| 0011 (offset to WA1 instB) | 9 |
| 0101 (offset to WA1 instC) | 10 |

METHOD AND APPARATUS FOR CONFIGURABLE MEMORY EMULATION

FIELD OF THE INVENTION

The present invention relates in general to apparatus for verifying electronic circuit designs and in particular, relates to hardware emulation systems and the implementation of configurable memories for emulation systems.

BACKGROUND OF THE INVENTION

Hardware emulation systems are devices designed for verifying electronic circuit designs prior to fabrication as chips or printed circuit boards. These systems are typically built from programmable logic chips (logic chips) and programmable interconnect chips (interconnect chips). The term "chip" as used herein refers to integrated circuits. Examples of logic chips include reprogrammable logic circuits such as field-programmable gate arrays ("FPGAs"), which include both off-the-shelf products and custom products. Examples of interconnect chips include reprogrammable FPGAs, multiplexer chips, crosspoint switch chips, and the like. Interconnect chips can be either off-the-shelf products or custom designed. Examples of emulation systems are described in U.S. Pat. No. 5,109,353 to Sample et al., and U.S. Pat. No. 5,036,473 to Butts et al., both of which are incorporated herein by reference.

Emulation systems are often used to verify large and complex designs for integrated circuit chips in which more than half of the transistors that will be used in the design are used to implement various memories in the user's design. These memories are also called memory instances. A comprehensive strategy for implementing memory in an emulation system is important to enhance usability of the emulation system and maximize the effective gate capacity of the emulation system. These memory instances that are present in integrated circuit designs have various depths, widths and varying numbers of read and write ports. Memories are typically classified by the number of memory locations they have (often referred to as the "depth" of the memory) and by the number of bits they can store in each location (often referred to as the "width" of the memory). For example, a memory circuit having thirty-two locations with each location containing eight bits and having two read ports and one write port would be called a thirty-two by eight, two Read, one Write port memory. The depth and width form the geometry of a memory instance. The number of read and write ports form the functionality of a memory instance.

Integrated circuit RAMs (also called RAM chips) are available in two common types; static and dynamic. A static RAM consists essentially of internal flip-flops that store the binary information, together with various decoding and encoding circuits. A dynamic RAM stores the binary information in the form of electric charges that are applied to capacitors. Dynamic RAMs also have various decoding and encoding circuits. These types of RAM integrated circuits have a fixed depth and width and typically have only a single read and write port. Therefore, they have disadvantages when directly emulating the various types of RAM instances commonly found in an integrated circuit or system design. For example, the architecture of a fixed RAM cannot be changed to implement a different design.

Prior art emulation systems implemented memory instances in one of two ways. Small memories were implemented using the memory resources present in the programmable logic chips that are a component of the emulator. These logic chips commonly have flip-flops and small static memories which can be combined in various ways to implement the memory instances found in a user's design. Larger memories were implemented using external boards or systems containing many static or dynamic RAM chips together with additional logic for routing address and data signals. An example of such a memory system is the CMM (Configurable Memory Module) available from Quickturn Design Systems, Inc. of Mountain View, Calif. These external boards or systems, however, are expensive and have only limited configurability. This makes it difficult to implement the large variety of memory instances commonly found in a user's design. Also, a large number of interconnect resources such as cables, switching chips and printed circuit board traces are required to interconnect the large number of signals required for a memory instance into the portion of the user's design residing in the emulation system. In addition, speed of the emulation system was typically limited by the inevitable delay resulting from the use of these interconnect resources.

Emulating multi-port memories adds additional difficulties. An example of a prior art method of implementing multi-port memories can be found in U.S. Pat. No. 5,448, 522 to Huang, the disclosure of which is incorporated herein by reference.

Thus, there is a need for a configurable method for implementing, in an emulation system, a variety of large memory instances commonly found in a user's design while making no substantial changes to emulation hardware and without the need for external hardware such as memory boards. Such a variety includes memory instances which have both large and small geometries, and a variable number of read and write ports.

SUMMARY OF THE INVENTION

The present invention overcomes the problems and disadvantages of the prior art by providing a configurable method for implementing, in an emulation system, the various large memory instances commonly found in a user's design. Many different types of memory instances with either a large geometry or many read or write ports can be implemented with substantially no changes to the emulation hardware. No external boards or systems are required to implement typical memory instances. The memory emulation software is also simplified because various types of memory instances can be compiled or implemented into the same physical hardware. The method and apparatus disclosed and claimed accomplishes these advantages over the prior art by sorting the memory instances in the user's input design, packing as many as possible of the memory instances into a physical RAM, counting the number of physical RAMs necessary to implement the plurality of memory instances, mapping the memory instances into physical RAMs, routing the address, data and control signals and programming a controller circuit to configure the physical memory.

The method for unified memory configuration of the present invention comprises the steps of sorting the memory instances, packing at least one of the plurality of memory instances into a physical memory and counting the number of physical memories necessary to implement the plurality of memory instances. A memory controller is programmed in programmable resources to configure the physical memory. The memory instances are then mapped into the physical memory.

An apparatus of the present invention comprises a physical memory divided into a plurality of segments and a set associative memory which is coupled to the physical memory. The set associative memory maps at least one of a plurality of sets into at least one of the plurality of segments. The apparatus further comprises an address input multiplexer for processing addresses associated with the plurality of sets and switching addresses onto main address lines. The apparatus also comprises a data input multiplexer for processing a plurality of data lines associated with the plurality of sets. The data input multiplexer also switches one of the plurality of data lines onto main data lines. A sequencer for providing time slots for the plurality of sets is coupled to the set associative memory.

The above and other preferred features of the invention, including various novel details of implementation and combination of elements will now be more particularly described with reference to the accompanying drawings and pointed out in the claims. It will be understood that the particular methods and circuits embodying the invention are shown by way of illustration only and not as limitations of the invention. As will be understood by those skilled in the art, the principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION OF THE DRAWINGS

Turning to the figures, the presently preferred apparatus and methods of the present invention will now be described.

A design which the user wishes to emulate (which will be referred to as a user's input design, because the user inputs the design into the emulator), typically contains numerous memory instances. These memory instances may have varying depths and widths. Furthermore, the memory instances may be single ported or multi-ported or a combination of both.

Figure 1:
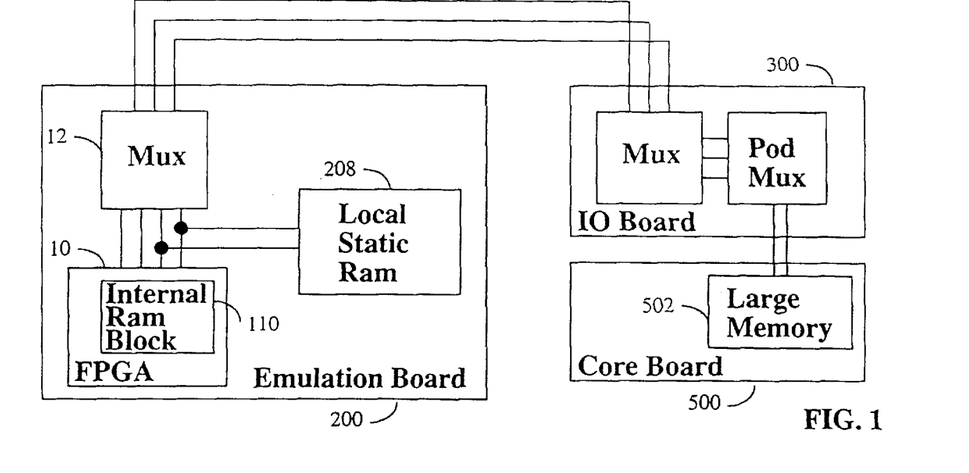
FIG. 1 is a block diagram of a tri-level memory architecture for an emulation system.

To accommodate these diverse memory instances, a three level memory architecture is employed as shown in FIG. 1. Small or unusual memories are implemented inside the programmable logic chips 10 on emulation boards 200. Unusual memories may be implemented using latches or flip-flops which are a component of the programmable logic chips 10. Small or highly multi-ported memories may be implemented using the internal RAM blocks 110 which are components of the logic chips 10. Larger memories with a moderate number of ports are implemented using the local static RAMs 208 on emulation boards 200. Very large or special purpose memories are implemented using a core board 500 which contains a large memory array 502. Core boards 500 attach to an IO board 300 which then attaches through a backplane (not shown) to emulation boards 200.

For the first level of the emulation memory architecture, each element (or configurable logic block of an FGPA) in the programmable logic chip 10 has a flip-flop or latch (the flip-flop or latch would be part of the configurable logic block if an FPGA is used) which can be used to implement simple memories. The cost of building a memory this way is more than seven gates/bit. In other words, for every bit of memory that can be implemented in this fashion, seven logic gates can no longer be implemented. Thus, in general, the present invention only utilizes this technique for implementing memory for simple registers or unusual memories such as flash-clear memory or content-addressable memory which cannot be implemented using other techniques.

Programmable logic chip 10 also has a large number of thirty-two-by-one single ported or sixteen-by-one dual ported memory blocks in an internal RAM block 110. The presently preferred embodiment utilizes FPGAs as logic chips 10 with the part number XC4036XL manufactured by Xilinx Corporation, San Jose, Calif., U.S.A. The present invention generally utilizes the memory blocks 110 of logic chip 10 for implementing small, highly multi-ported memories such as register files. This is done using time multiplexing to achieve multiple write ports and duplication of logic to achieve multiple read ports. Time multiplexing may also be used to achieve multiple read ports but at a lower speed. This is because each additional time multiplexing slot takes a certain amount of fixed time (see FIG. 7). One time slot is needed for each read or write port. Read ports may also be implemented by making additional copies of the memory. It may not always be possible to implement small, highly multi-ported memories in a single logic chip 10. This is because some highly multi-ported memories can require thousands of input/output pins. Thus, it may not be practical to implement them completely on one logic chip 10. Furthermore, implementation of a memory on a single logic chip 10 may not be desirable because it might prevent the optimal partitioning of the user's design among all of the logic chips 10. In either of these cases, a single memory instance may be split across a plurality of logic chips 10.

Figure 2:
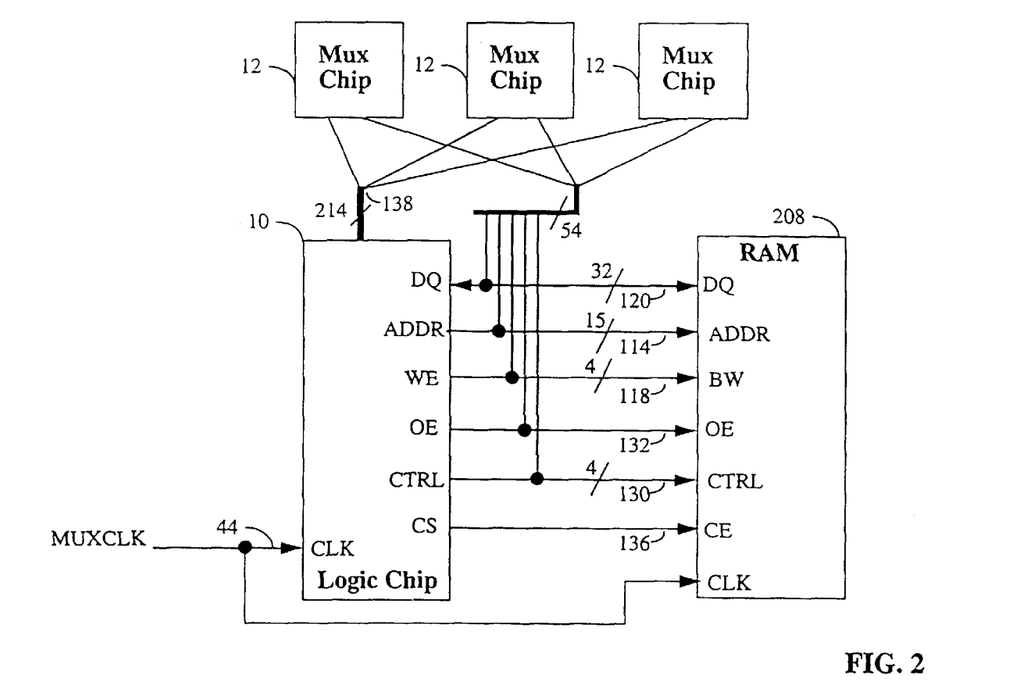
FIG. 2 is a block-diagram showing the interconnections in an emulation system between a physical RAM chip, a programmable logic chip used to implement the configurable memory controller circuit and several Mux chips.

Reference is made to FIG. 2, where a second level implementation of memory instances for emulation is shown (i.e., where memory instances are implemented in memory chips installed on the emulation boards 200). FIG. 2 shows the interconnections between a RAM chip 208, a logic chip 10 and several interconnect chips 12 (interconnect chips are also referred to as Mux chips) on an emulation board 200. An example of a presently preferred emulation board 200 can be seen in co-pending application Ser. No. 08/865,741, to Sample et al, filed May 30, 1997, which is incorporated herein by reference in its entirety. FIG. 2 has been simplified for clarity. In an actual embodiment of emulation board 200, there are thirty-six logic chips 10, twelve RAM chips 208 and fifty-four Mux chips 12. Logic chip 10 has a number of signals which are also connected to RAM chip 208. All of these connections except the interconnection between the chip select ("CS") pin on logic chip 10 and the chip enable ("CE") pin 136 on the RAM chip 208 are connected to Mux chips 12.

If the RAM function is not needed for a particular RAM chip 208, the associated logic chip 10 is programmed so that the CE connection 136 to RAM 208 is inactive. This causes all of the output and bidirectional pins of RAM 208 to tristate. Mux chips 12 are then programmed to route user design signals to logic chip 10. Logic chip 10 is then used to emulate a portion of the user's input design logic.

If the RAM function is required for a particular RAM chip 208, CE connection 136 from logic chip 10 to RAM chip 208 will be programmed to activate RAM chip 208. Logic chip 10 is then programmed with a RAM controller design 100 as will be described below with reference to FIG. 3. When this occurs, pins of Mux chips 12 that attach to RAM 208 (signals 120, 114, 118, 132 and 130) will be tristated. Thus, the signals 120, 114, 118, 132 and 130 will be driven by logic chip 10 or RAM chip 208. The pins of the Mux chips 12 are tristated (i.e., placed in a high impedance state) so that the signals 120, 114, 118, 132 and 130 can be driven by logic chip 10 or RAM 208.

In a presently preferred embodiment, a synchronous static RAM is used for Ram chip 208. An example of a synchronous static RAM used in the presently preferred embodiment is an MT58LC32K32C4 device available from Micron Technology. One of skill in the art will realize that many other types of synchronous static RAMs are available from Micron Technology and others which would also be suitable. In addition, other types of RAMs such as static or dynamic RAMs could be used. It is noted that the use of a synchronous static RAM having a thirty-two kilobyte by thirty-two architecture is arbitrary. Larger or smaller RAMs could be used, depending on the requirements for the emulation system. Selection of a RAM is a matter of the designer's choice and depends on the desired speed, cost, size and other factors to be achieved. A synchronous static Ram is utilized in the presently preferred embodiment because when used with controller 100 (described with reference to FIG. 3), it offers the highest possible operating speed.

Connections between logic chip 10 and RAM 208 include data input/output lines 120, address lines 114, write enables 118, output enable 132, control lines 130 and chip enable 136. A fast clock signal MUXCLK 44 also goes to both chips. The operation of these signals will now be explained with reference to FIG. 3.

Figure 3:
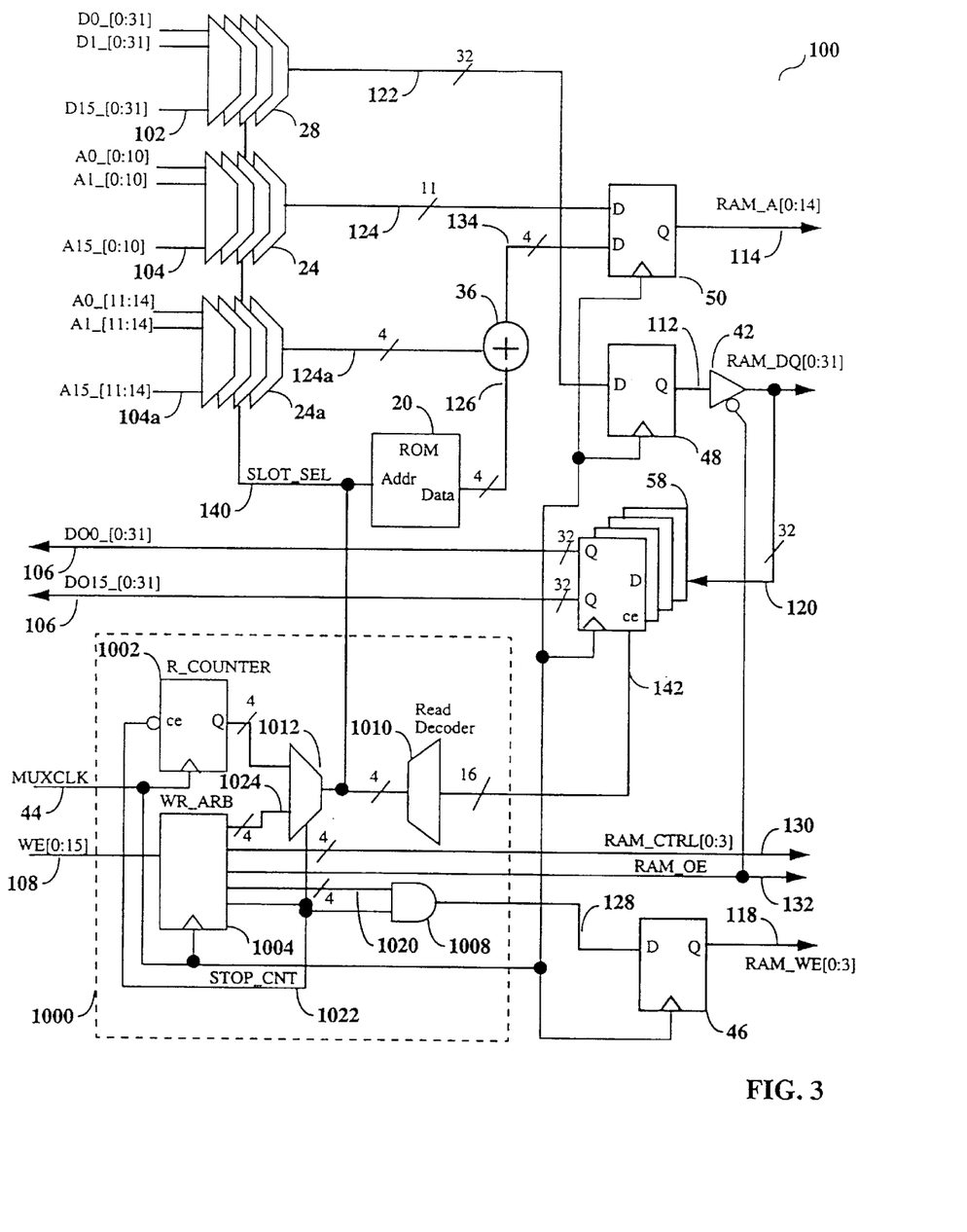
FIG. 3 is a block diagram of a configurable memory controller circuit.

FIG. 3 shows a block diagram of a memory controller circuit 100 which is programmed into logic chip 10 when the RAM 208 is used. Connections to the user's design are at the left edge of FIG. 3 and connections to RAM chip 208 are at the right edge of FIG. 3 (it is to be understood that any use of directions, such as right, left, etc. are merely for purposes of description and not a limitation of the orientation of the connections or circuit components). The memory controller circuit 100 comprises several major portions or blocks. Multiplexers 28 select a set of time-multiplexed ("TDM") data input signals 122 from a plurality of sets of data input signals 102 (D0_[0:31], D1_[0:31] up to D15_[0:31]). Selection of a particular TDM data input signal 122 is controlled by a slot select signal 140. The slot select signal 140 increments at each time slot. A time slot is a time window during which a particular memory operation is taking place. A time multiplexed architecture arranges signal transmission such that each signal is transmitted in a specific time slot. Data input signals 102 will be present if a write port is being emulated for a particular time slot. If the data width is less than thirty-two signals 102, some of the TDM data input signals 122 for a particular time slot may not be present. The connection of user input signals 102 will be explained further with reference to FIG. 6 and FIG. 7. After selection, data input signals 122 are stored in register 48 (in a presently preferred embodiment, register 48 comprises thirty-two flip-flops). Register 48 is a pipeline delay stage intended to improve operating speed of the memory controller 100. After register 48, the data input signals 112 pass through buffer 42 to produce RAM_DQ[0:31] signals 120 which are communicated to the data input/output pins of RAM 208. Buffer 42 is controlled by RAM_OE signal 132 coming from sequencer block 1000. When RAM_OE signal 132 is active, the RAM 208 is outputting data and buffer 42 is tristated.

A set of address signals 104 is similarly selected by multiplexers 24 to produce time-multiplexed ("TDM") address signals 124. Multiplexer 24 is also controlled by slot select signal 140. TDM address signals 124 will be present whenever a particular time slot is used to implement a read or write port. Some of the TDM address signals 124 may not be present if the depth of the memory instance implemented in a particular time slot does not require them. TDM address signals 124 also pass through a pipeline register 50 to produce RAM_A signals 114 connecting to the address inputs of RAM 208. As seen in FIG. 2, RAM_A signals 114 are sent to the address pins of the RAM 208.

A second set of address signals 104a is selected by Mux 24a to produce time multiplexed ("TDM") address signals 124a. In the presently preferred embodiment, these are the four highest bits of the memory instance address and will only be present if the memory instance being implemented at a particular time slot has a depth greater than 2048 (2K) words. TDM address signals 124a are added to offset signals 126 by adder 36 to produce address signals 134. Read only memory ("ROM") 20 and adder 36 produce a different offset for each memory instance, thereby allowing multiple RAM instances to share the same physical RAM 208. ROM 20 and adder 36 comprise a set associative memory in which the sets of input signals are mapped by programming ROM 20 into physical segments of RAM 208 (placing groups of memory addresses into disjoint sections of a physical memory is referred to herein as set associative memory. This function is performed by controller 100 in combination with RAM 208). ROM 20 is addressed by slot select signal 140. ROM 20 is programmed to implement a particular set of memory instances as will be explained further with reference to FIGS. 4–8. Loading the ROM 20 provides the set association between sets of data, address and write enable pins and the physical memory segments required to implement multi-port memories or memories with a large geometry (in a presently preferred embodiment, a memory with a large geometry would comprise a memory instance having a word length greater than the word length of RAM 208). After passing through adder 36, address signals 134 go through pipeline register 50 to produce the upper four RAM_A signals 114 which go to RAM 208. In a preferred embodiment, ROM 20 is implemented using a few of the small static memories that are a component of logic chip 10. In another embodiment, a RAM or some other type of memory could be used in place of ROM 20 without affecting the functionality of controller 100. A ROM is preferred because it takes fewer resources to implement in programmable logic chip 10.

Data signals 120 from the RAM 208 are latched in registers 58 to produce data output signals 106 (DO0_[0:31], DO1_[0:31] up to DO15_[0:31]). In a presently preferred embodiment, there will be sixteen registers 58 each being thirty-two bits wide. These are the outputs from the user's memory instances. Output registers 58 are controlled by a chip enable signal 142 which is produced in sequencer block 1000 (discussed below). Chip enable signal 142 is true (i.e., high) for each register when the corresponding slot select 140 signal is true.

Sequencer circuit 1000 (also shown in FIG. 3) produces write enable signals 128 in response to the user's write enable inputs 108. Write enable signals 128 pass through pipeline register 46 to produce RAM_WE signals 118 which control the writing of data into each byte of RAM 208. In a presently preferred embodiment, there are four RAM_WE signals.

The operation of sequencer 1000 will now be further explained. Sequencer 1000 comprises read counter 1002, write arbitrator 1004, AND gate 1008, multiplexer 1012 and decoder 1010. Read counter 1002 increments at each cycle of MUXCLK signal 44 if a read port operation is desired for a particular time slot. This is signified by the STOP_CNT signal 1022 being inactive. The output of read counter 1002 is selected by Mux 1012 to produce slot select signal 140 whenever STOP_CNT signal 122 is inactive, signifying a read operation is to take place. STOP_CNT signal 122 will be inactive if no write operation is currently pending. Slot select signal 140 is then decoded by decoder 1010 to produce clock enable signals 142 for output registers 58 which capture data outputs from RAM 208.

If a write operation is requested for a particular time slot, write arbitrator circuit 1004 produces a port address signal 1024 in response to user's write enable inputs 108. When a write operation is requested, write arbitrator circuit 1004 will stop read port counter 1002 and cycle through all of the write ports. During this time, port address signal 1024 is selected by multiplexer 1012 to produce slot select signal 140. In addition to STOP_CNT signal 1022 and port address signals 1024, write arbitrator circuit 1004 produces several other signals. RAM_OE signal 132 controls the input/output direction of RAM data signals 120. RAM_CTRL[0:3] signals 130 control special functions of the RAM such as burst mode and loading of addresses. In a preferred embodiment, there are four RAM_CTRL signals. Write Enable signals 1020 select the particular bytes of data that are to be written. These are ANDed in gate 1008 with STOP_CNT signal 1022 to produce write enable signals 128 which, after passing through pipeline register 46, produce write enable signals 118 (RAM_WE[0:3]) going to RAM 208.

The memory controller 100 employs both space and time domain multiplexing. The memory controller 100 can have different configurations depending on different ratios between time and space slots. "Time slot" refers to a time window during which a particular memory operation is taking place. One time slot is associated with one memory port on the user's memory. "Space slot" refers to a block in the physical memory 208 at which a particular memory operation is taking place. One space slot is associated with a data segment or a memory instance. The following table illustrates some of the different ways memory controller 100 could be configured when a sixteen-to-one time multiplexing technique is used

| Time Slot/ Space Slot | Single Instance | Multiple Instances | Port Configuration |
| --- | --- | --- | --- |
| 1/1 | 2K × 512 | 16 × (2K × 32) | single port |
| 2/1 | 4K × 256 | 8 × (4K × 32) | 2-port |
| 4/1 | 8K × 128 | 4 × (8K × 32) | 4-port |

-continued

| Time Slot/ Space Slot | Single Instance | Multiple Instances | Port Configuration |
| --- | --- | --- | --- |
| 8/1 | 16K × 64 | 2 × (16K × 32) | 8-port |
| 16/1 | 32K × 32 | 1 × (32K × 32) | 16-port |

A memory analysis feature may also be provided with memory controller 100. A memory analysis feature allows the user of an emulation system to read or write the contents of any memory instance implemented in a RAM 208 independently of the logic operations associated with the user's design. This is done by reserving one time slot for debug access. A typical one read, one write port memory (i.e., a memory with two ports) would then be implemented with three ports, one for read, one for write and one for debug access. A JTAG shift register (not shown in FIG. 3) is constructed as part of controller 100 in programmable logic chip 10 as is well understood by those skilled in the art of using the JTAG protocol with programmable logic devices. This shift register is connected to the data input, data output, address and write enable inputs for the debug port. By uploading and downloading data over the JTAG port, any location in the physical RAM 208 can be read or written without disturbing operation of the user's design.

The physical RAM 208 is divided in a number of segments (N segments). In a presently preferred embodiment, each segment has 2k (2048) memory locations.

Figure 4:
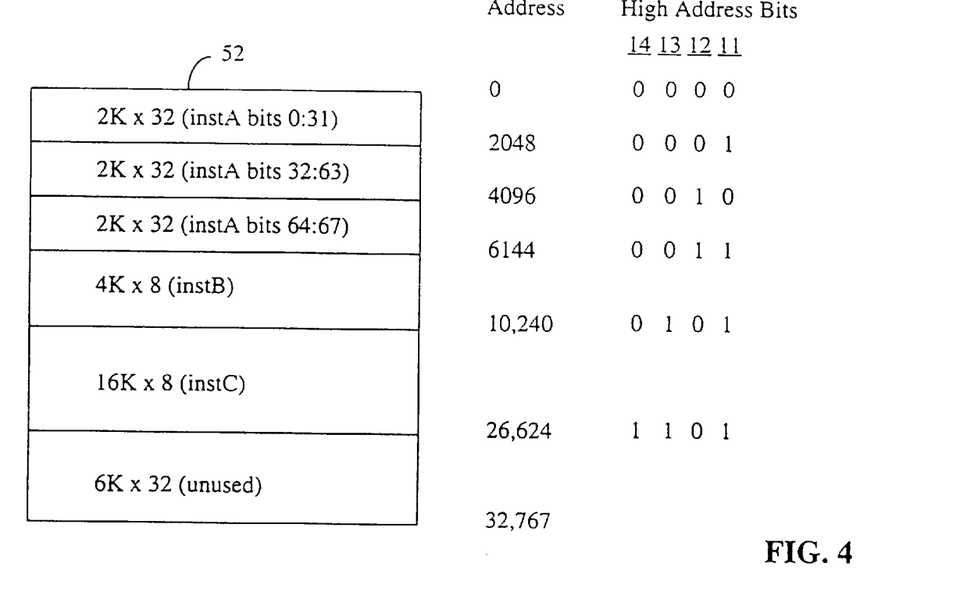
FIG. 4 illustrates the packing of an exemplary set of memory instances into a physical RAM.

FIGS. 4–8 illustrate how the ROM 20 in controller 100 may be programmed for an exemplary set of memory instances. Referring to FIG. 4, the physical memory 208 configuration is shown when packed with three memory instances ("packed" means that a plurality of unrelated user memory instances are placed into a single RAM 208. As few RAMs 208 as possible are used to implement all of the memory instances in a design):

| | | |
| --- | --- | --- |
| Instance A | 2K × 68 | one write, one read ports |
| Instance B | 4K × 8 | one write, two read ports |
| Instance C | 16K × 8 | one write, one read ports |

Instance A is split into 3 parts because the required width of sixty-eight is greater than the physical width, thirty-two, of the RAM 208 used in the presently preferred embodiment. Bits 0–31 are located at addresses 0–2047; bits 32–63 are located at addresses 2048–4095 and bits 64–67 are located at addresses 4096–6143. This is an example of space multiplexing. Instance B is then located at addresses 6144–10,239 and instance C is located at addresses 10,240–26,623. The top four bits of physical address 114 (RAM_A[11:14]) are shown for each memory segment at the right of FIG. 4. The reason for this is that the top four bits correspond to the values which must be programmed into ROM 20 to address those segments.

Figure 5:
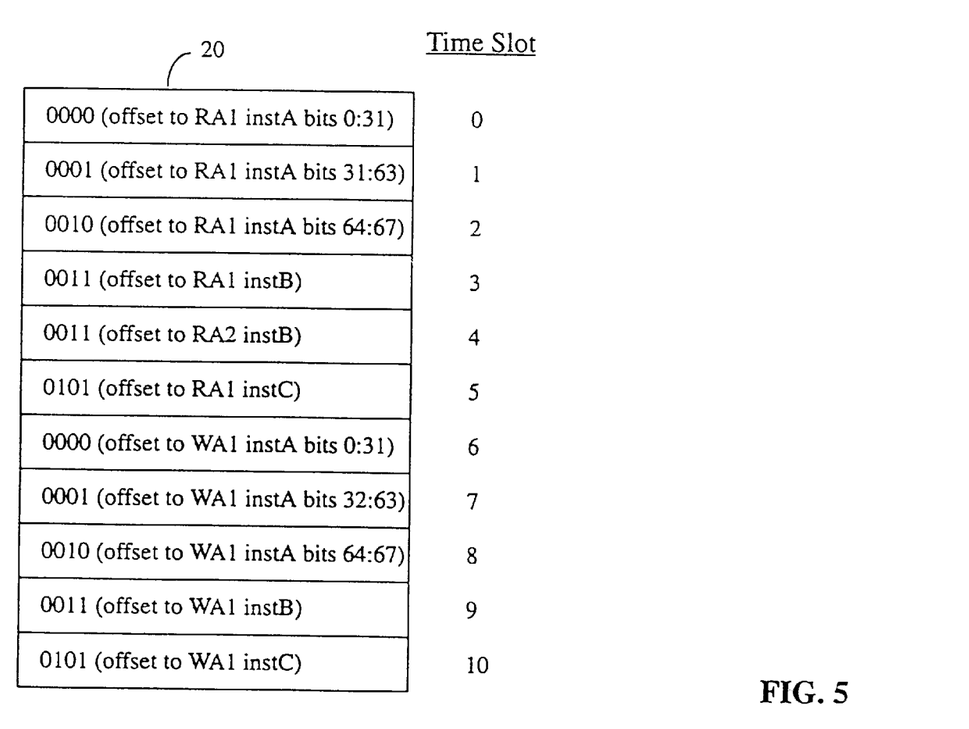
FIG. 5 illustrates the programming of a ROM to configure the memory controller circuit for an exemplary set of memory instances.

Referring now to FIG. 5, the contents of ROM 20 are shown for the same exemplary set of memories. A total of eleven time slots are required; six for instance A, three for instance B and two for instance C. An additional time slot (not shown) could also have been reserved for memory analysis. Time slots zero, one and two are used to implement the read port for instance A. Since instance A is split into three parts (as explained earlier) to obtain a sixty-eight bit width from thirty-two physical data pins on RAM 208, three time slots are required for each port of instance A. Similarly, the write port on instance A uses three time slots (six, seven and eight). Instance B uses time slot three for the first read port and time slot four for the second read port. Time slot nine is used for the write port. Instance C uses time slot five for the read port and time slot ten for the write port. ROM 20 is programmed so that, for each time slot, it includes the offset necessary to address the correct memory segment as shown in FIG. 4. In this example, segments of physical memory 208 have a minimum size of 2K (2048) locations so that ROM 20 need only contain four bits of data (2K*2$^4$= 32K) in order to access all 32K locations of physical RAM 208. It is noted that a larger or smaller segment size could have been used depending upon the desired tradeoffs of the system. For example, a smaller segment size would allow physical RAM 208 to be packed more efficiently but requires a larger ROM 20.

Figure 6:
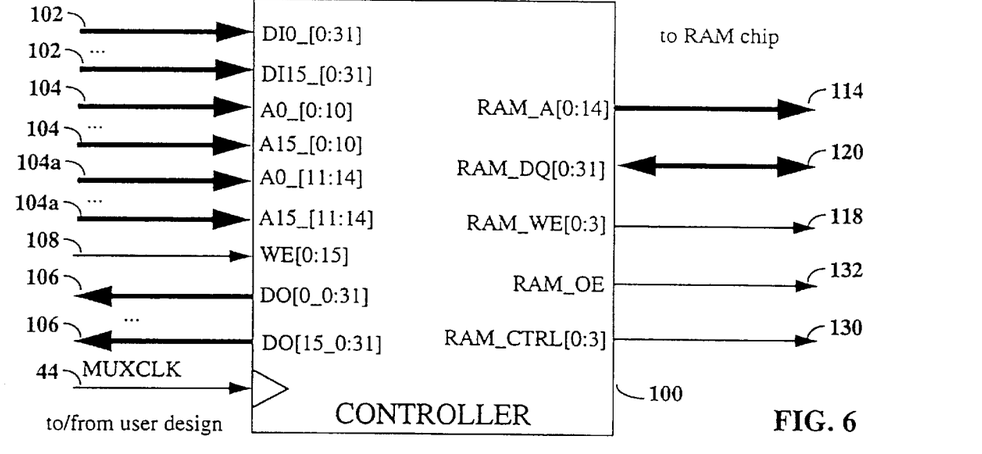
FIG. 6 is a block diagram of the memory controller circuit showing the connections to memory instances and to the physical RAM.

Referring now to FIG. 6, the external connections to memory controller 100 are shown. Connections to and from the user's memory instances are at the left and connections to physical RAM 208 are at the right (as above, it is to be understood that any use of directions, such as right, left, etc. are merely for purposes of description and not a limitation of the orientation of the connections or circuit components). The connections from the memory controller 100 to the user's memory instances include the following:

| Data input signals | 102 | DI0_[0:31] to DI15_[0:31] |
|---|---|---|
| Address input signals | 104 and 104a | A0_[0:14] to A15_[0:14] |
| Write enable signals | 108 | WE[0:15] |
| Data output signals | 106 | DO0_[0:31] to DO15_[0:31] |

The connections from the memory controller 100 to the physical RAM 208 include the following:

| RAM address signals | 114 | RAM_A[0:14] |
|---|---|---|
| RAM data signals | 120 | RAM_DQ[0:31] |
| RAM output enable | 132 | RAM_OE |
| RAM write enables | 118 | RAM_WE[0:3] |
| RAM control signals | 130 | RAM_CTRL[0:3] |

In addition, MUXCLK signal 44 provides a fast clock. These signals correspond to those shown in FIG. 2 and FIG. 3.

In most cases, not all of the signals connecting to the controller 100 will be used. Unused input signals will be grounded while unused output signals will be left floating. The logic of controller 100 may be optimized after input and output signals are connected to remove unused logic. This is possible because the controller is programmed into a programmable logic chip 10 such as an FPGA. By optimizing the logic used to implement the controller 100, the logic resources of logic chip 10 can be used for other purposes, e.g., for implementing additional logic from a user's logic design.

Figure 7:
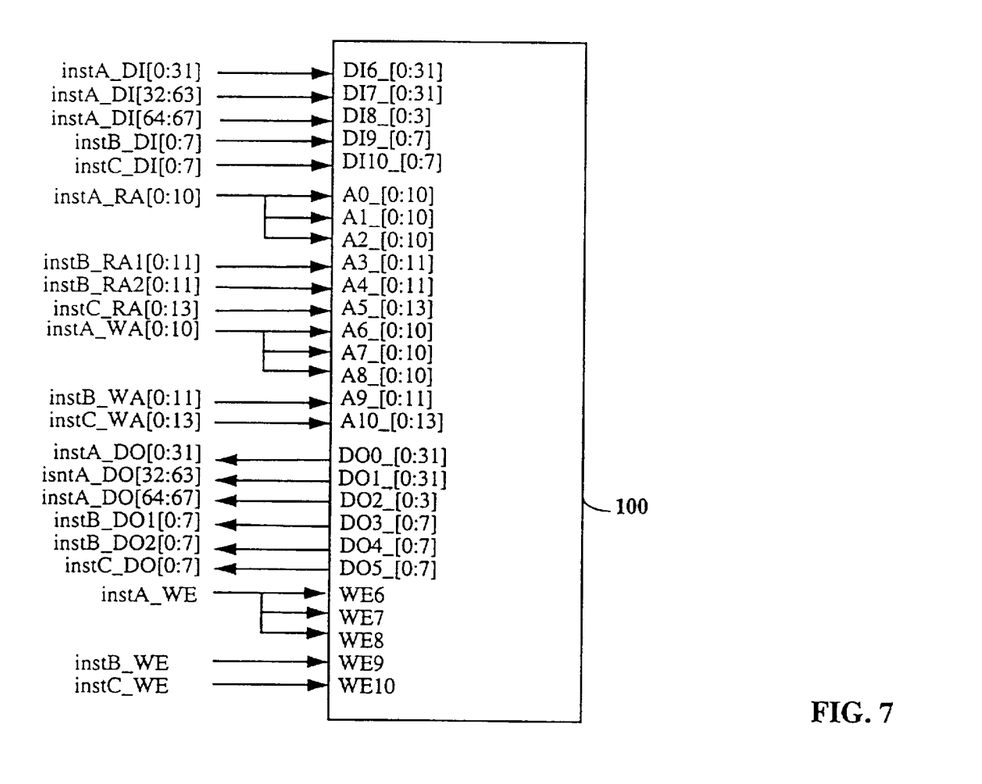
FIG. 7 illustrates the connection to the memory controller circuit for an exemplary set of memory instances.

Referring now to FIG. 7, the manner in which signals from the exemplary user's memory instances A, B and C are connected to controller 100 is disclosed.

Instance A uses time slots zero, one and two for the read port and time slots six, seven and eight for the write port. Signals for instance A are therefore connected to the controller 100 as follows:

| User Memory Instance Pins | | Controller Pins | |
|---|---|---|---|
| data inputs [0:31] | (InstA_DI[0:31]) | Port 6 data inputs [0:31] | (DI6_[0:31]) |
| data inputs [32:63] | (InstA_DI[32:63]) | Port 7 data inputs [0:31] | (DI7_[0:31]) |
| data inputs [64:67] | (InstA_DI[64:67]) | Port 8 data inputs [0:3] | (DI8_[0:3]) |
| data outputs [0:31] | (InstA_DO[0:31]) | Port 0 data outputs [0:31] | (DO0_[0:31]) |
| data outputs [32:63] | (InstA_DO[32:63]) | Port 1 data outputs [0:31] | (DO1_[0:31]) |
| data outputs [64:67] | (InstA_DO[64:67]) | Port 2 data outputs [0:3] | (DO2_0:3]) |
| read address inputs [0:10} | InstA_RA[0:10]) | Port 0 address inputs [0:10] | (A0_[0:10]) |
| | | Port 1 address inputs [0:10] | (A1_[0:10]) |
| | | Port 2 address inputs [0:10] | (A2_[0:10]) |
| write address inputs [0:10] | (instA_WA[0:10]) | Port 6 address inputs [0:10] | (A6_[0:10]) |
| | | Port 7 address inputs [0:10] | (A7_[0:10]) |
| | | Port 8 address inputs [0:10] | (A8_[0:10]) |
| write enable input | (InstA_WE) | Port 6 write enable input | (WE6) |
| | | Port 7 write enable input | (WE7) |
| | | Port 8 write enable input | (WE8) |

Similarly, instance B uses time slot three for the first read port, slot four for the second read port and slot nine for the write port. Signals for instance B are therefore connected to the controller 100 as follows:

| User Memory Instance Pins | | Controller Pins | |
|---|---|---|---|
| data inputs [0:7] | (InstB_DI[0:7]) | Port 9 data inputs [0:7] | (DI9_[0:7]) |
| read port 1 outputs [0:7] | (InstB_D01[0:7]) | Port 3 data outputs [0:7] | (DO3_[0:7]) |
| read port 2 outputs [0:7] | (InstB_D02[0:7]) | Port 4 data outputs [0:7] | (DO4_0:7] |
| read address 1 inputs [0:11] | (instB_RA1[0:11]) | Port 3 address inputs [0:11] | (A3_[0:11]) |
| read address 2 inputs [0:11] | (instB_RA2[0:11]) | Port 4 address inputs [0:11] | (A4_[0:11]) |
| write address inputs [0:11] | (InstB_WA[0:11]) | Port 9 address inputs [0:11] | (A9_[0:11]) |
| write enable input | (InstB_WE) | Port 9 write enable input | (WE9) |

Similarly, instance C uses time slot five for the read port and slot 10 for the write port. Signals for instance C are therefore connected to the controller 100 as follows:

| User Memory Instance Pins | | Controller Pins | |
|---|---|---|---|
| data inputs [0:7] | (InstC_DI[0:7]) | Port 10 data inputs [0:7] | (DI10_[0:7]) |
| data outputs [0:7] | (InstC_D0[0:7]) | Port 5 data outputs [0:7] | (DO5_[0:7]) |
| read address inputs [0:13] | (InstC_RA[0:13]) | Port 5 address inputs [0:13] | (A5_[0:13]) |
| write address inputs [0:13] | (InstC_WA[0:13]) | Port 10 address inputs [0:13] | (A10_[0:13]) |

-continued

| User Memory Instance Pins | Controller Pins | |
|---|---|---|
| write enable input | (InstC_WE) Port 10 write enable input | (WE10) |

Figure 8:
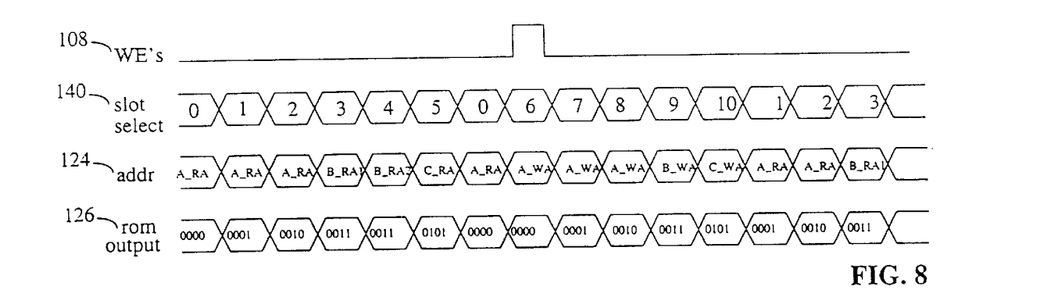
FIG. 8 illustrates the timing of the memory controller circuit for an exemplary set of memory instances.

Referring to FIG. 8, the timing for controller 100 and memory 208 will now be disclosed. Slot select signal 140 normally increments continuously through the read ports. For the set of exemplary memory instances, six slots (from slot zero to slot five) are used for read ports. Therefore, in the absence of a write enable signal 108, read port counter 1002 (shown in FIG. 3) and slot select signal 140 cycle from zero to five and back to zero. When a write enable signal 108 occurs, the write arbitrator circuit cycles through all the write ports and the read port counter is stopped. This is controlled by STOP-CNT signal 1022 (in FIG. 3). For the set of exemplary memory instances, time slots six through ten are used for write ports. Thus, slot select signal 140 jumps from zero (the last read port) to six (the first write port) and increments up to ten (the last write port). After all of the write ports have been serviced, STOP_CNT signal 1022 is set back to zero by write arbitrator circuit 1004 and read port counter 1002 resumes counting. The slot select signal then goes to one (the next read port) and begins cycling from zero to five again.

Address signal 124 (from FIG. 3) reflects the set of addresses that have been chosen by SLOT_SEL signal 140. ROM output signal 126 reflects the ROM contents corresponding to SLOT_SEL signal 140. This output signal corresponds with the ROM values shown in FIG. 5.

The software necessary to efficiently use controller 100 will now be disclosed. An emulation board memory (EBM) compiler program is used to map memory instances found in the user's design into the physical memories 208 on the emulation boards 200 (for a complete discussion of the software used in a presently preferred hardware logic emulation system, see co-pending application serial no. (not yet assigned, Lyon & Lyon Docket No. 225/033), to Sample et al, filed May 30, 1997). The EBM compiler program performs two main functions. First, the number of physical memories 208 that are required to implement all large memory instances in the user's design is estimated (as discussed above, small memory instances may be mapped into logic chips 10 on emulation boards 200 and very large memory instances may be mapped to memory 502 on core board 500). EBM compiler program provides this information to an emulation board partitioning program to ensure that too many memory instances are not packed onto a single emulation board 200. An emulation system can be comprised of more than one emulation board. Thus, the user's design can be partitioned, or broken up, into sections, each of the sections being implemented on a particular emulation board 200. If too many memory instances are packed onto a single emulation board 200, the design will not fit, making emulation of that design not possible. In situations like this, the memory instances must be spread over more than one emulation board.

The second function of the EBM compiler program is to map the memory instances present in the user design into the individual physical memories 208.

The function of the EBM compiler can be broken down into the following steps:

First, the EBM compiler sorts the memory instances in the user's design based upon their sizes and read/write port configurations. To start this sorting step, all memory instances from the user's design are read from the emulation database and collected in an array which will then be sorted. In a presently preferred embodiment, there are three steps in sorting the memory instances. First, sorting is done by the total number of input/output pins of the memory instances. Second, sorting is done by number of memory segments required by the memory instances. Third, sorting is done by number of time slots required. Other criteria could be used for sorting as well without deviating from the concepts of the present invention.

Next, the EBM compiler packs the memory instances into a single physical memory 208 until one of the constraints is met. The constraints include:

The total number of input/output pins required for all instances packed into any memory 208 must not exceed the number of input/output pins 138 available on programmable logic chip 10 to connect signals to Mux chips 12. In a presently preferred embodiment, two-hundred and fourteen pins are available for connection to memory instances in a single RAM 208 (as shown in FIG. 2). If the pins are time-multiplexed, then the maximum pin limit may be increased.

The total depth of all memory instances packed into a physical memory 208 must not exceed the depth of memory 208.

The number of time slots required to implement all read and write ports as well as extra time slots required for space multiplexing and memory analysis must not exceed the number of time slots available in memory controller 100. In a presently preferred embodiment, controller 100 supports sixteen time slots, one of which is reserved for memory analysis, leaving fifteen available for packing memory instance.

Packing is performed by repeatedly examining each instance in the array of all memory instances and combining them into sub-instances until one of the constraints is met.

EBM compiler then counts the number of physical memory 208 devices that it will take to implement all large memory instances and provides this information when needed to a board partitioning program.

Next, the EBM compiler attaches a property in the emulation database to each physical RAM 208 location identifying all memory instances that are to be placed in that RAM. A chip instance is created in the database from a precompiled EBM_CTRL cell representing the logic of controller 100 and an EBM_CELL representing the external connections or wrapper around the controller 100. The new chip instance incorporates all the individual memory instances that were mapped to that physical RAM 208.

Next, all of the connections that go to the original memory instances packed into a RAM 208 are redirected so that they go to the new EBM_CELL wrapper pins.

Finally, the EBM compiler performs the configuration step which includes allocating the memory instances to specific time slots and producing a configuration for each ROM 20 as explained previously with reference to FIGS. 4–8.

The design of memory controller 100 is the same for all physical memories 208 in the emulation system. This allows the design of controller 100 to be highly optimized for speed and efficient use of logic elements within programmable logic chip 10. Connection of user design signals in logic chip 10 to multiplexers 28, 24, 24a, write enable arbitrator 1004 and output latches 58, however, depends on the specific memory instances being implemented and is different for each RAM 208 and logic chip 10.

Thus, a preferred method and apparatus for emulating integrated circuit memory has been described. While embodiments and applications of this invention have been shown and described, as would be apparent to those skilled in the art, many more embodiments and applications are possible without departing from the inventive concepts disclosed herein. The invention, therefore is not to be restricted except in the spirit of the appended claims. It is intended that all matter contained in the above description and shown in the accompanying drawings shall be interpreted as being illustrative and not limiting. The invention, therefore, is not to be limited except in accordance with the claims.

What is claimed is:

1. A unified configurable memory architecture for emulation comprising:
    a physical memory divided into a plurality of segments; and
    a programmable logic chip coupled to said physical memory and implementing a controller function, said controller function comprising:
        a set associative memory coupled to said physical memory, where said set associative memory maps at least one of a plurality of sets into a least one of said plurality of segments;
        an address input multiplexer for processing addresses associated with said plurality of sets, and switching one of said addresses onto main address lines;
        a data input multiplexer for processing a plurality of data lines associated with said plurality of sets, and switching one of said plurality of data lines onto main data lines; and
        a sequencer, for providing time slots for said plurality of sets, coupled to said set associative memory.

2. The apparatus of claim 1 wherein said programmable logic chip is further coupled to a plurality of multiplexer chips.

3. The apparatus of claim 1 wherein said physical memory is further coupled to a plurality of multiplexer chips.

4. The apparatus of claim 1 wherein said programmable logic chip may be reconfigured to implement a portion of the logic of the user's input design when a memory function is not required.

* * * * *